(12) United States Patent
Myoung

(10) Patent No.: US 9,756,983 B2
(45) Date of Patent: Sep. 12, 2017

(54) SALAD SPINNER

(71) Applicant: Progressive International Corporation, Kent, WA (US)

(72) Inventor: Sul Gi Myoung, Federal Way, WA (US)

(73) Assignee: PROGRESSIVE INTERNATIONAL CORPORATION, Kent, WA (US)

( * ) Notice: Subject to any disclaimer, the term of this patent is extended or adjusted under 35 U.S.C. 154(b) by 0 days.

(21) Appl. No.: 14/824,524

(22) Filed: Aug. 12, 2015

(65) Prior Publication Data

US 2016/0045072 A1    Feb. 18, 2016

Related U.S. Application Data

(60) Provisional application No. 62/038,127, filed on Aug. 15, 2014.

(51) Int. Cl.
*A23B 5/00* (2006.01)
*A47J 43/044* (2006.01)
*A47J 43/24* (2006.01)

(52) U.S. Cl.
CPC ............. *A47J 43/044* (2013.01); *A47J 43/24* (2013.01); *A47J 2043/04454* (2013.01)

(58) Field of Classification Search
CPC . A47J 2043/04454; A47J 43/044; A47J 43/24
USPC .......... 99/348, 479, 485, 495, 511–513, 516, 99/536; 68/213; 210/380.1, 474, 477; 134/140, 143, 145, 149, 153–158, 162
See application file for complete search history.

(56) References Cited

U.S. PATENT DOCUMENTS

| | | | | |
|---|---|---|---|---|
| 4,007,751 A | * | 2/1977 | Commiant | A47J 43/24 134/140 |
| 5,064,535 A | | 11/1991 | Hsu | |
| 6,622,618 B1 | * | 9/2003 | Glucksman | A47J 43/24 210/360.1 |
| 2007/0137504 A1 | * | 6/2007 | Wan | A47J 43/24 99/495 |
| 2007/0256315 A1 | * | 11/2007 | Wong | A47J 43/24 34/58 |
| 2008/0197046 A1 | * | 8/2008 | So | A47J 43/24 206/541 |
| 2008/0210103 A1 | * | 9/2008 | Wan | F26B 5/08 99/495 |
| 2009/0038485 A1 | * | 2/2009 | Kavanaugh | B02C 19/08 99/537 |

(Continued)

FOREIGN PATENT DOCUMENTS

FR         2711904 A1    5/1995

OTHER PUBLICATIONS

Search Report issued in corresponding European Application No. 15180822.7, mailed Feb. 24, 2016, 3 pages.

*Primary Examiner* — Dana Ross
*Assistant Examiner* — Joseph Iskra
(74) *Attorney, Agent, or Firm* — Lowe Graham Jones PLLC

(57) ABSTRACT

A salad spinner includes a lid with openings to allow water to pass through the lid and into the bowl, or from the bowl out through the lid. The bowl includes openings on a bottom portion of the bowl to allow water to pass through the bottom of the bowl. A removable cover allows the bottom portion of the bowl to be selectively sealed.

12 Claims, 12 Drawing Sheets

(56) References Cited

U.S. PATENT DOCUMENTS

2010/0263555 A1* 10/2010 Mah ..................... A47J 43/24
99/495

* cited by examiner

US 9,756,983 B2

SALAD SPINNER

PRIORITY CLAIM

This application claims the benefit of prior U.S. provisional application 62/038,127, filed Aug. 15, 2014, the contents of which are hereby incorporated by reference.

FIELD OF THE INVENTION

This invention relates generally to salad spinners.

BACKGROUND OF THE INVENTION

Salad spinners are commonly used to dry salad leaves, herbs, or other similar food items. A typical salad spinner generally includes an external bowl supporting an internal basket. The basket is supported in a manner which it can spin within the bowl, thereby propelling items within the basket toward the perimeter of the basket. Water attached to lettuce leaves is likewise flung to the perimeter where it is expelled through holes in the basket while being retained within the bowl. Consequently, the leaves or other items within the bowl are dried.

One problem with salad spinners is that it is awkward and sometimes difficult to drain the water from the device. Salad spinners are often large, and the entire device must be partially disassembled in order to remove the lid and tip the spinner for draining. If the lid is removed the user must then use hands or some other tool to keep the salad within the basket when tipping it for draining, or must also remove the basket in order to allow it to drain. The configuration of existing salad spinners also makes it difficult or impossible to use the salad spinner as a vehicle to further rinse the salad, and instead it must be rinsed with the salad outside the bowl and then placed in the bowl to dry.

SUMMARY OF THE INVENTION

The present invention comprises a salad spinner which, in various embodiments, includes features allowing for water to drain through the bottom of the bowl, through the lid, or both.

In one version of the invention, the outer bowl includes one or more drain holes allowing for water to drain through the bowl. In an example of the invention, several pluralities of drain holes are provided, including drain holes at the bottom of the bowl and drain holes extending at least partially up the side of the bowl.

In an optional version, a lower cover or lid is removably attachable to the bowl to cover the plurality of drain holes to provide a watertight seal when the lid is attached.

In some versions, the bowl includes one or more resilient feet allowing for the bowl to have a nonskid surface at the bottom.

In an example of the invention, the lid includes one or more holes allowing for water to pass into or out of the bowl. In a preferred version, the lid includes a plurality of such holes, positioned on one half of the generally circular lid. The lid may further include a raised lip at the perimeter adjacent the plurality of holes in the lid, along with an inclined surface extending from a central location in the lid toward the peripheral raised lip in order to direct water on the lid into and through the holes while preventing the water from flowing over the side of the lid. In one example, the lid also includes at least a slightly raised rim surrounding the entire perimeter of the lid.

The lid further includes a drive for causing an internal basket to spin within the bowl, and in one version the mechanism is configured as a handle carried on a rotating disk, in which the disk is offset from the center of the lid in a direction away from the through-holes formed in the lid.

In an illustrated example, the drive carried on the lid is configured to drive an interface, which may be formed as a cage with a plurality of fins for interacting with the internal basket so that rotation of the motor causes the cage and the basket to spin.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
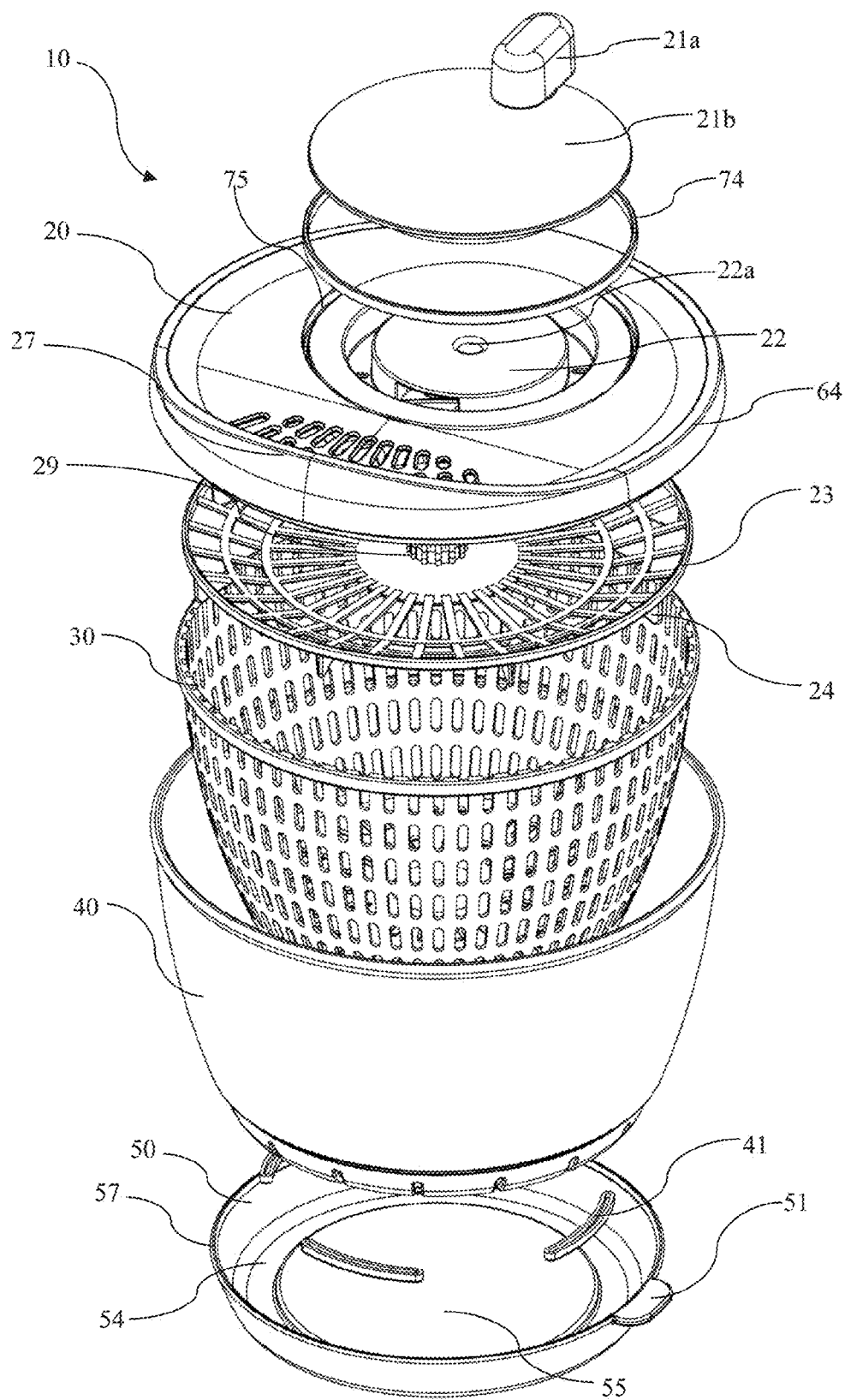
FIG. 1 is an exploded view of a preferred salad spinner.
Figure 2:
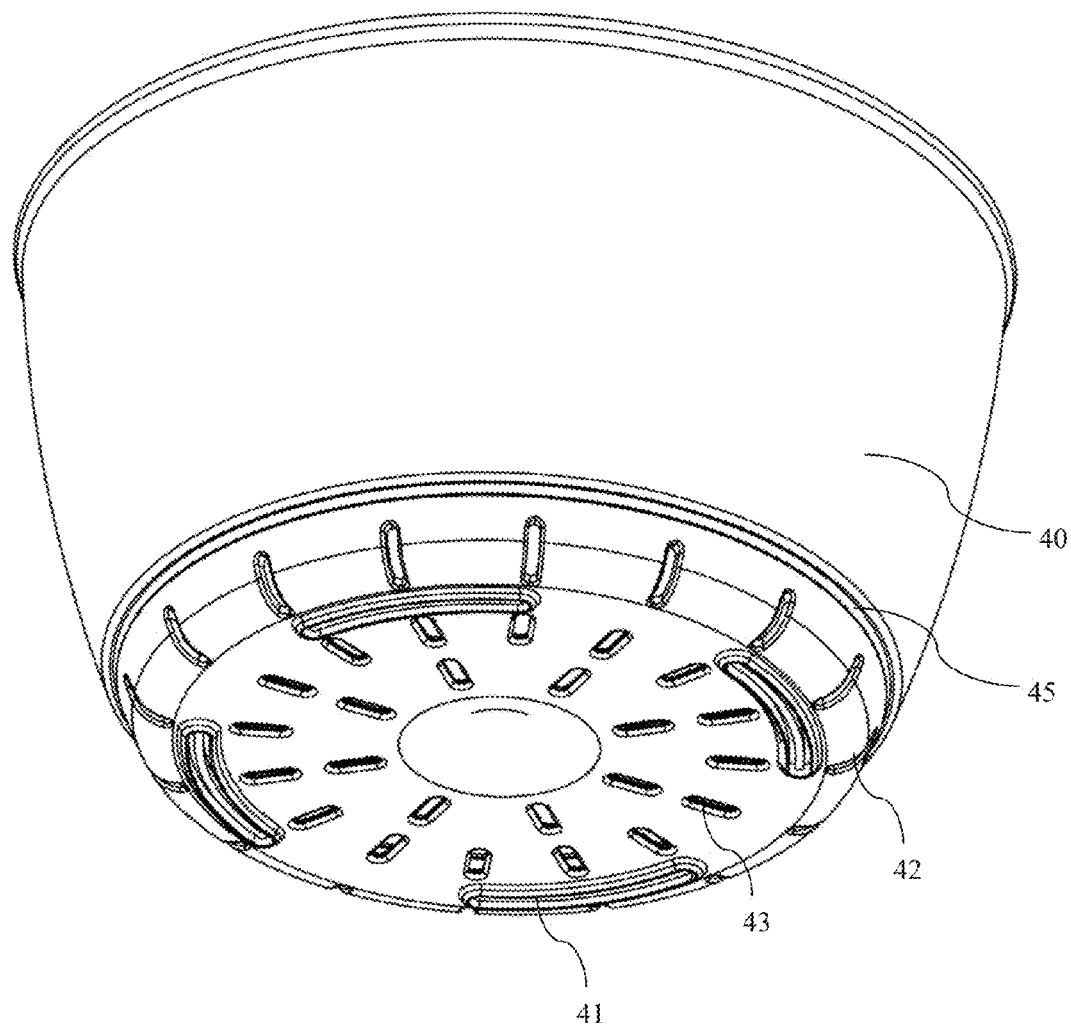
FIG. 2 is a bottom perspective view of a preferred salad spinner bowl.
Figure 3:
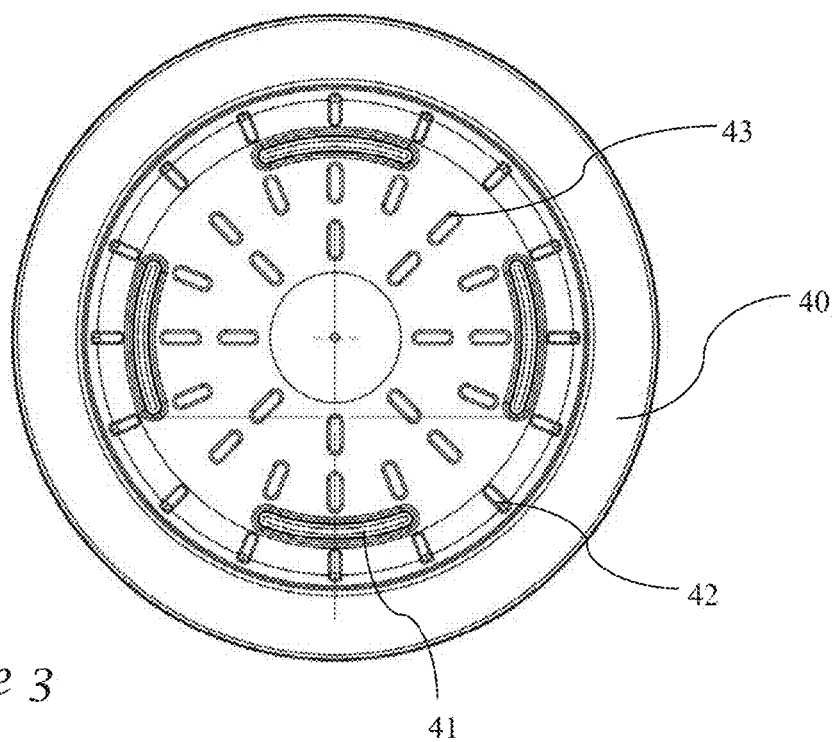
FIG. 3 is a bottom view of a preferred salad spinner bowl.

A preferred salad spinner is shown in the accompanying figures, including the exploded view of FIG. 1 illustrating the manner in which the salad spinner is assembled. In the illustrated version, a salad spinner 10 includes an upper lid 20, an inner basket 30, a lower bowl 40, and a bottom lid or tray 50.

The lid 20 preferably includes a hand powered motor providing a mechanism for causing the basket to spin. The motor may take any of a variety of forms, and in the illustrated version a handle 21a is pivotally attached to a post 75 extending upwardly from a perimeter of a disk 21b positioned on the upper side of the lid on a hub 22. Most preferably, the disk 21b rotates on an axle 72 carried on the center 22a of the hub 22, with the axle extending through the hub to the lower side of the lid 20.

The hub optionally includes internal components such as one or more gears to convey the circular motion of the handle and disk to spinning motion of a lower cage 23 attached to the inside of the lid. In the illustrated example, the hub includes a lower surface with inwardly-directed circular gear teeth 70, preferably integrally formed with the disk and configured to rotate with the disk. An outer flange 74 is attached to the lower surface of the gear, preferably radially outward from the gear, and is trained in a mating channel 75, which defines the circular path of travel of the disk within the lid.

In some versions, the cage 23 includes a centrally located gear 29 that meshes with the gear 70 positioned within the hub 22. The cage may include a short axle 77 configured to be attached to a central receiving boss 60 formed on the lower surface of the lid to secure the cage to the lid. The hub center 22a is radially offset from the center 60 of the generally circular lid 20 so that the gear 70 in the hub can engage the gear 29 positioned at the center of the circular cage. In this fashion, rotation of the disk will cause rotation of the cage. Any number of gears may be provided within the hub 22 to translate the rotary motion of the handle to a spinning motion of the cage while providing a mechanical advantage. In some versions, however, there may be a more direct connection to the cage, without additional gearing, such as described above. Likewise, in some versions the hub may be coaxial with the center of the lid.

While the illustrated version depicts a spinning mechanism in the form of a handle carried on a rotating hub, in other versions of the invention the mechanism for imparting a spinning motion may be in a form such as a handle and pull-cord, reciprocating ratchet, or other structures. Primarily, the spinning mechanism serves as a device for enabling the user to cause the turret or inner cage 23 to spin. Most preferably, the spinning mechanism is configured for one-way powered spinning of the cage, and therefore the inner basket of the salad spinner. Accordingly, the hub may further include an internal ratchet or clutch allowing for rotation of the basket in only one direction and for free-spinning of the basket when the handle rotation is stopped. Optionally, the lid may also include a brake configured to stop the cage from spinning, such as by imparting a frictional force on the cage.

The cage 23 is illustrated as having a plurality of spokes emanating from a central axle that extends vertically downward from a central support 60 positioned on the lid. In the preferred version, the cage terminates in a peripheral rim having a circular shape. It should be appreciated that the cage need not be formed as a series of spokes and concentric circular structures as illustrated, and in other versions of the invention the cage may be in the form of a thin solid disc or other configurations. Similarly, the salad spinner may include a plunger or other means for causing rotation of the basket instead of the types of motors described above, and in some such structures the motor may engage the basket in a central location or at some position other than at the upper rim as in the illustrated version. In some such versions of the invention, there may not be a cage as described.

Figure 10:
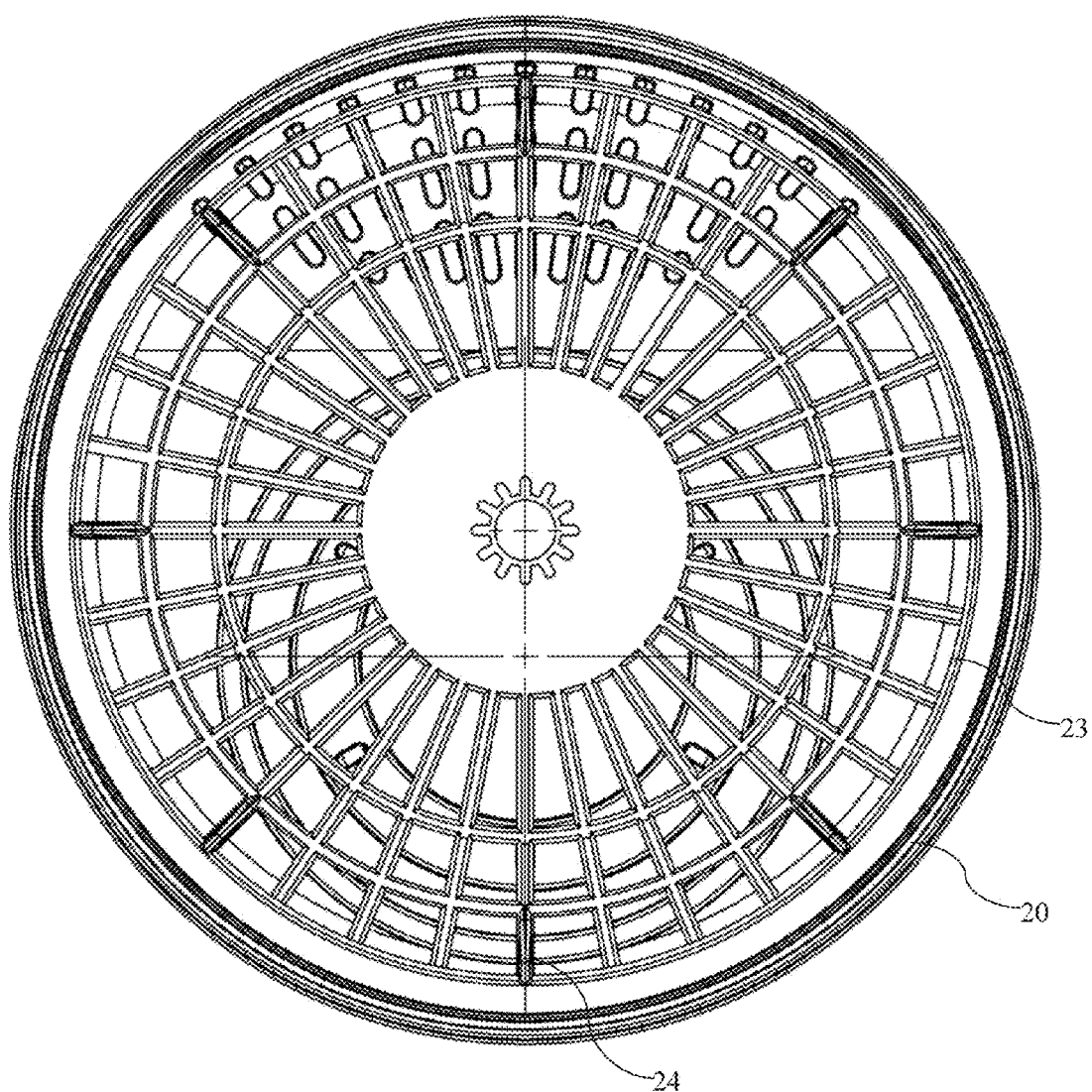
FIG. 10 is a bottom view of a preferred salad spinner lid, shown with an inner cage.
Figure 11:
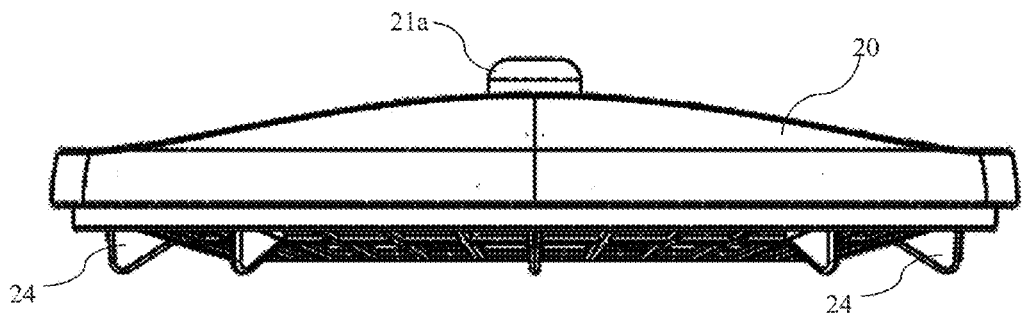
FIG. 11 is a side view of a preferred salad spinner lid.

At the perimeter of the cage, several downwardly extending fins 24 are provided, such as best seen in FIGS. 10 and 11. The upper rim of the basket terminates in a plurality of slots 32 that begin at the upper rim and extend downward vertically along the inner portion of the sidewalls of the basket. The basket may have any number of slots, but for ease of mating the fins 24 from the upper lid with corresponding slots 32 formed in the basket, most preferably the basket is formed with a number of slots that is much greater than the number of fins in the cage. The fins are sized and shaped to engage slots 32 formed in the upper rim of the basket 30 such that when the cage spins the fins cause the basket to spin as well.

Figure 12:
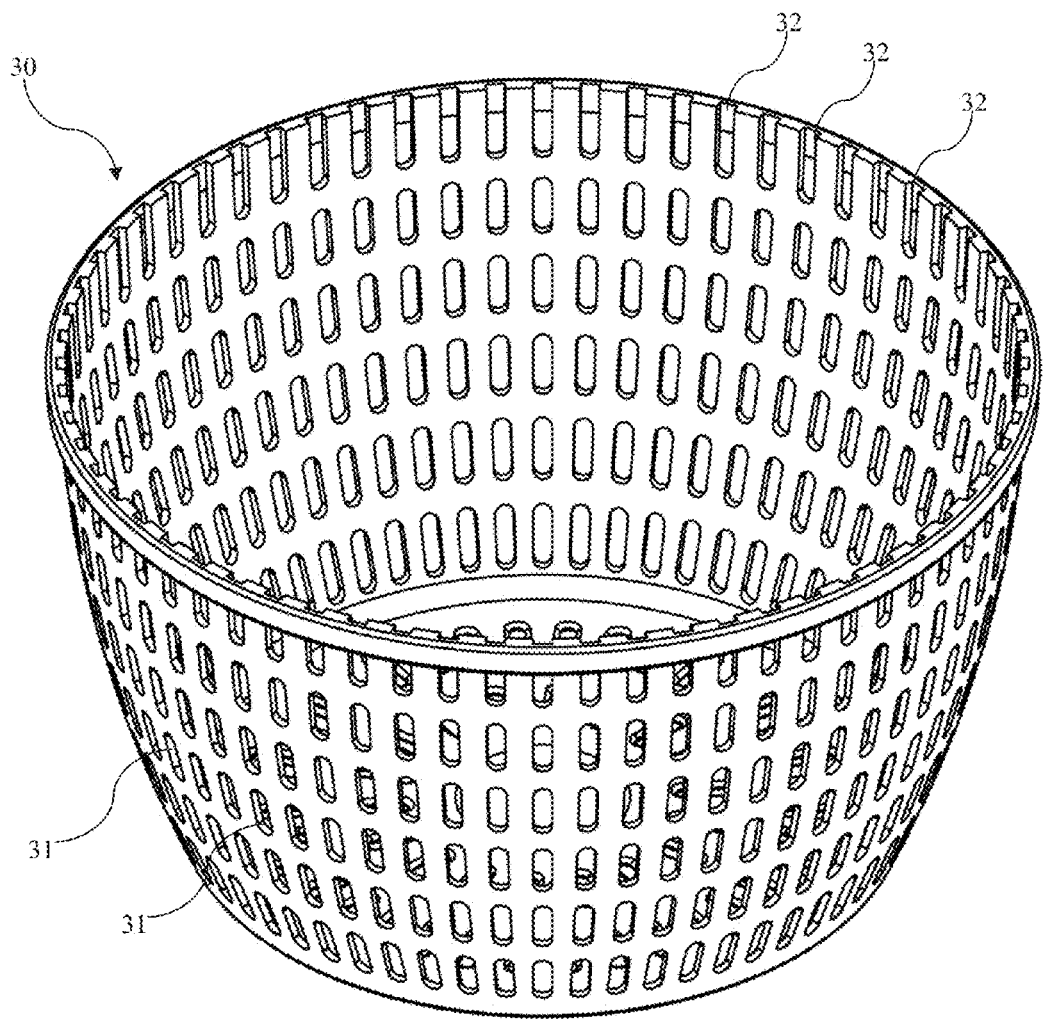
FIG. 12 is a top perspective view of a preferred salad spinner basket.

The basket 30 is formed with a bottom surface and upwardly extending sidewalls having a plurality of through holes 31, as seen for example in FIG. 12. In the illustrated version, the through holes are positioned throughout the bottom and the entirety of the sidewalls. Most preferably, there are a sufficient number of openings within the basket to allow water or other liquids to travel readily from the interior space formed by the basket through the openings or through holes and toward the bowl.

Figure 4:
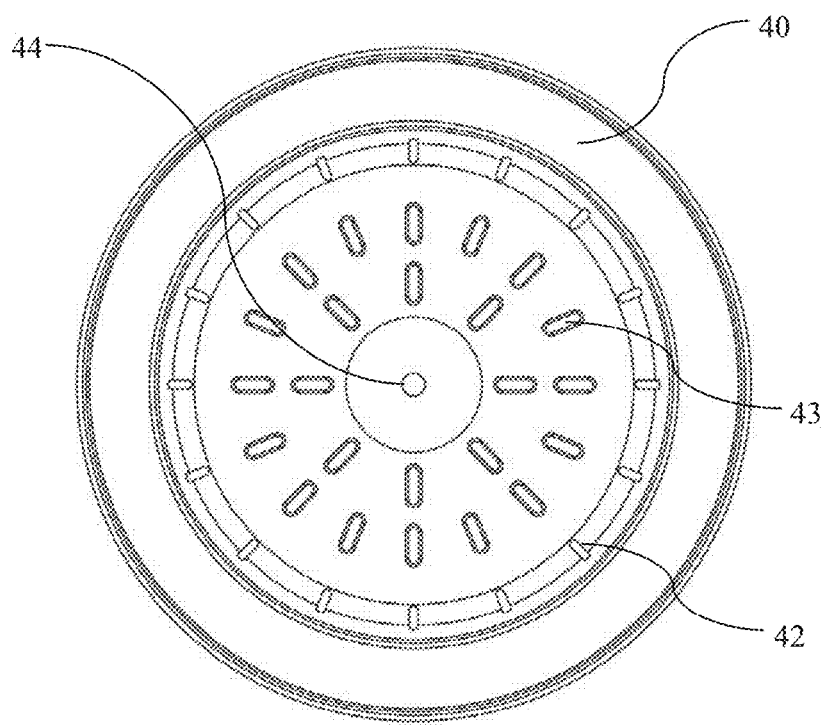
FIG. 4 is a top view of a preferred salad spinner bowl.
Figure 5:
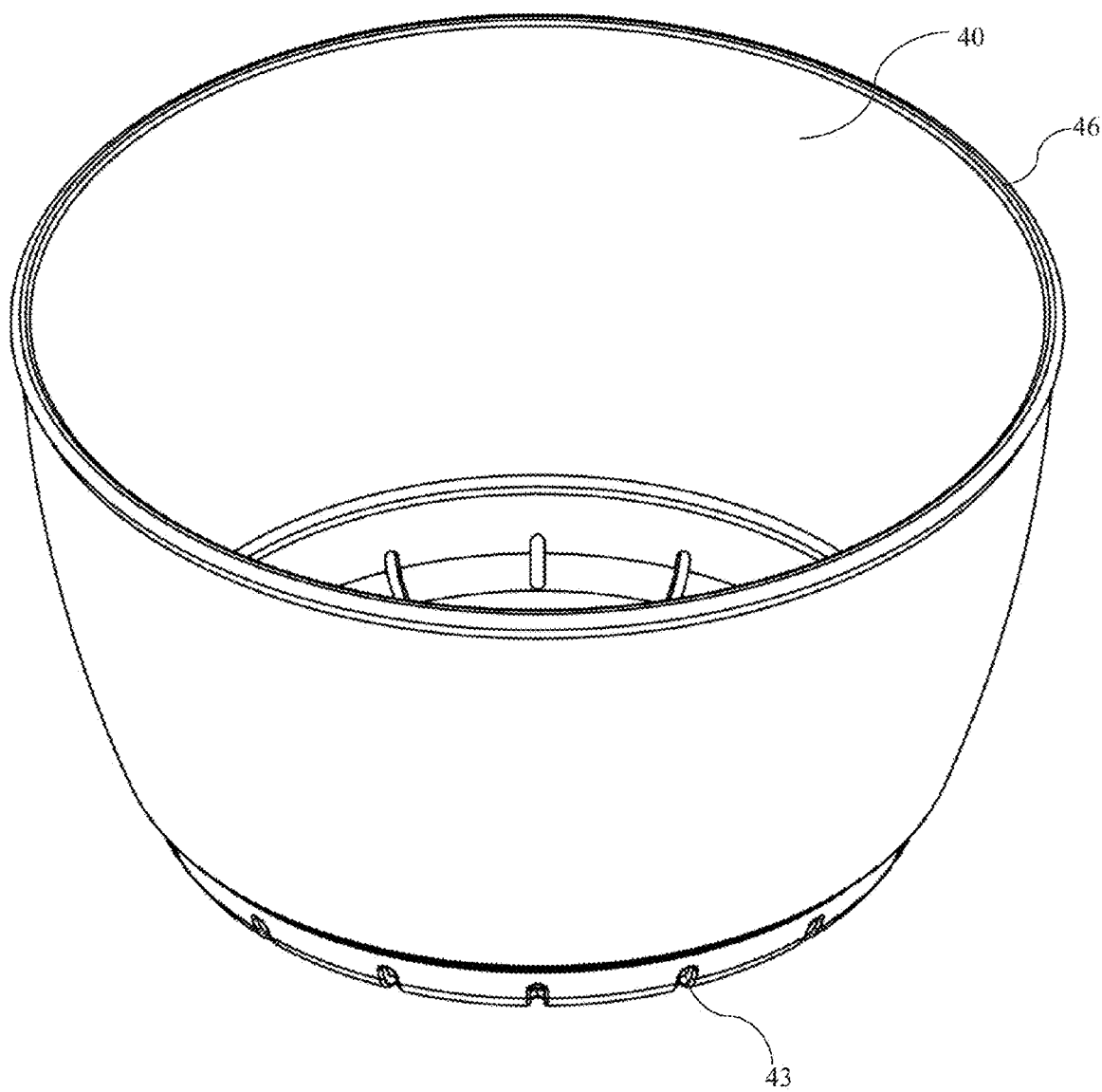
FIG. 5 is a top perspective view of a preferred salad spinner bowl.
Figure 13:
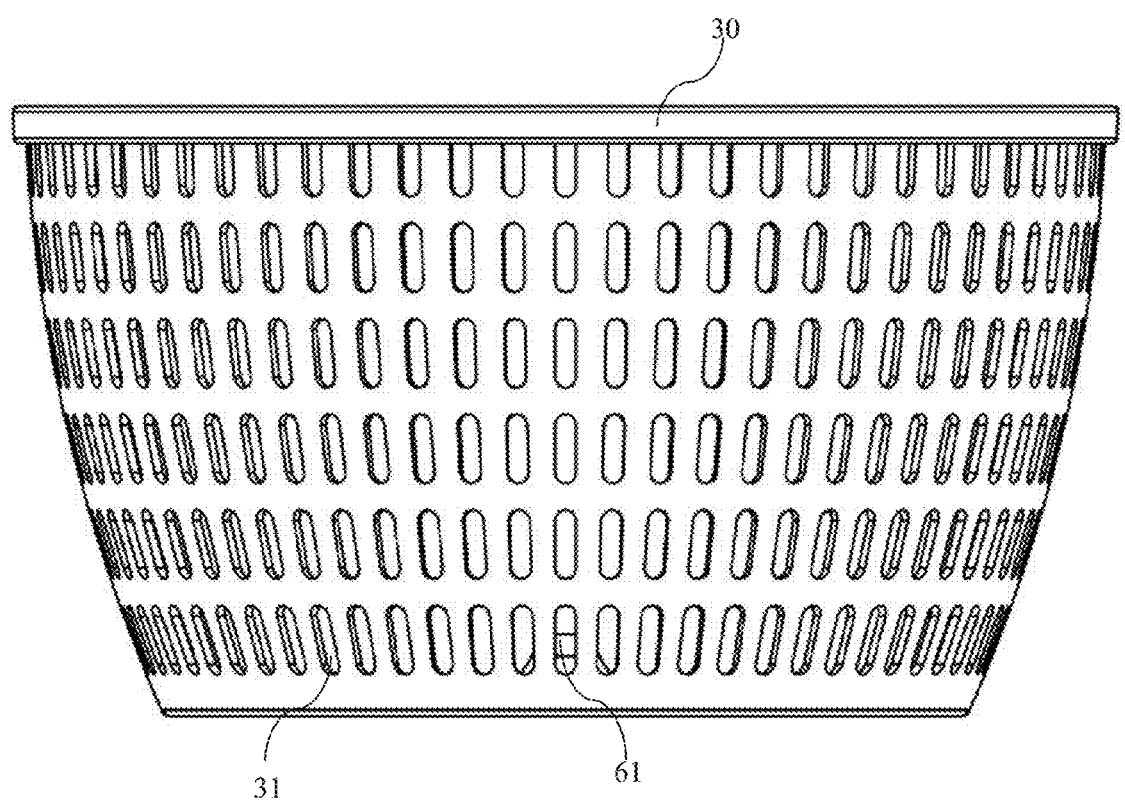
FIG. 13 is a side view of a preferred salad spinner basket.
Figure 14:
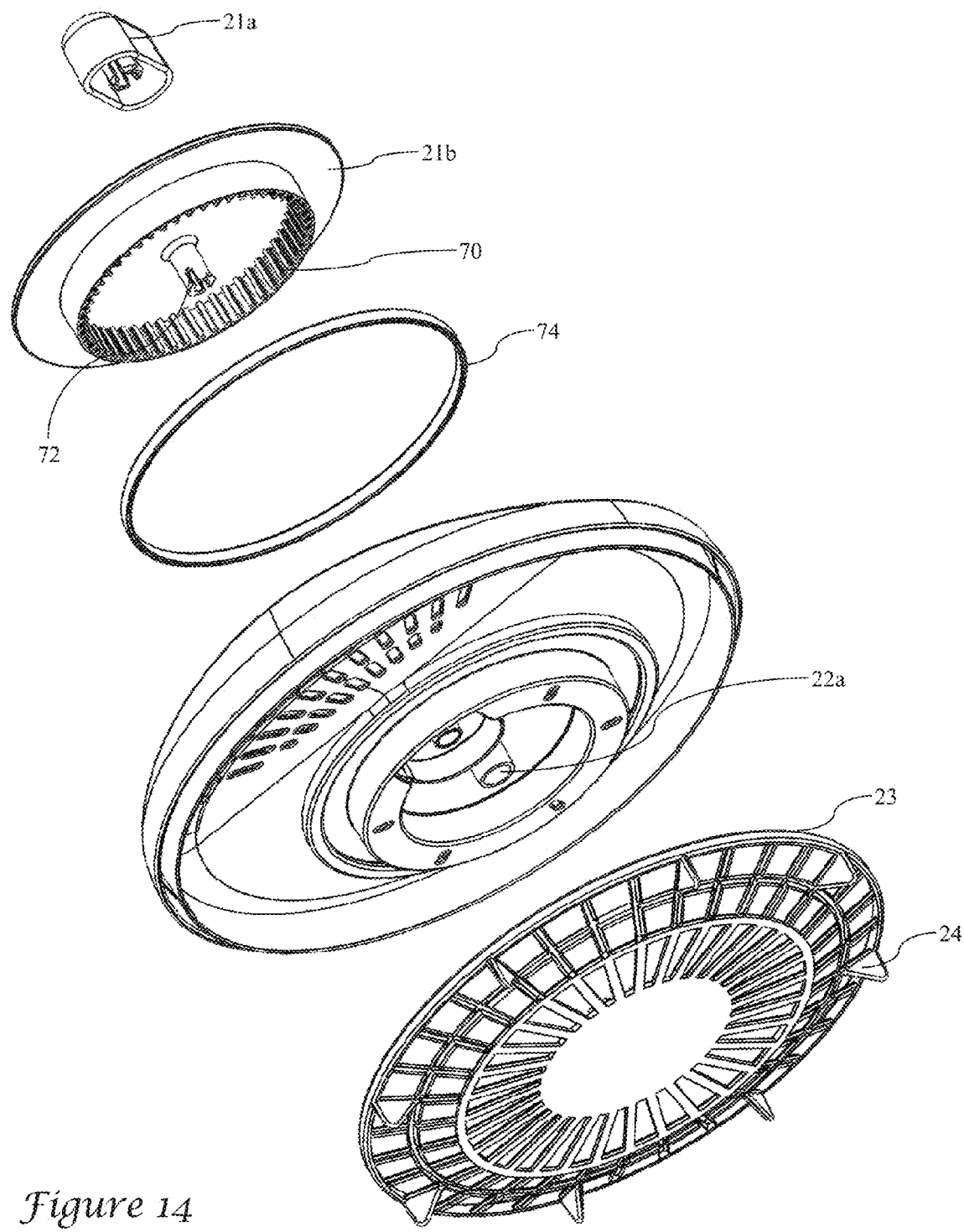
FIG. 14 is a bottom perspective exploded view of a preferred salad spinner lid.
Figure 15:
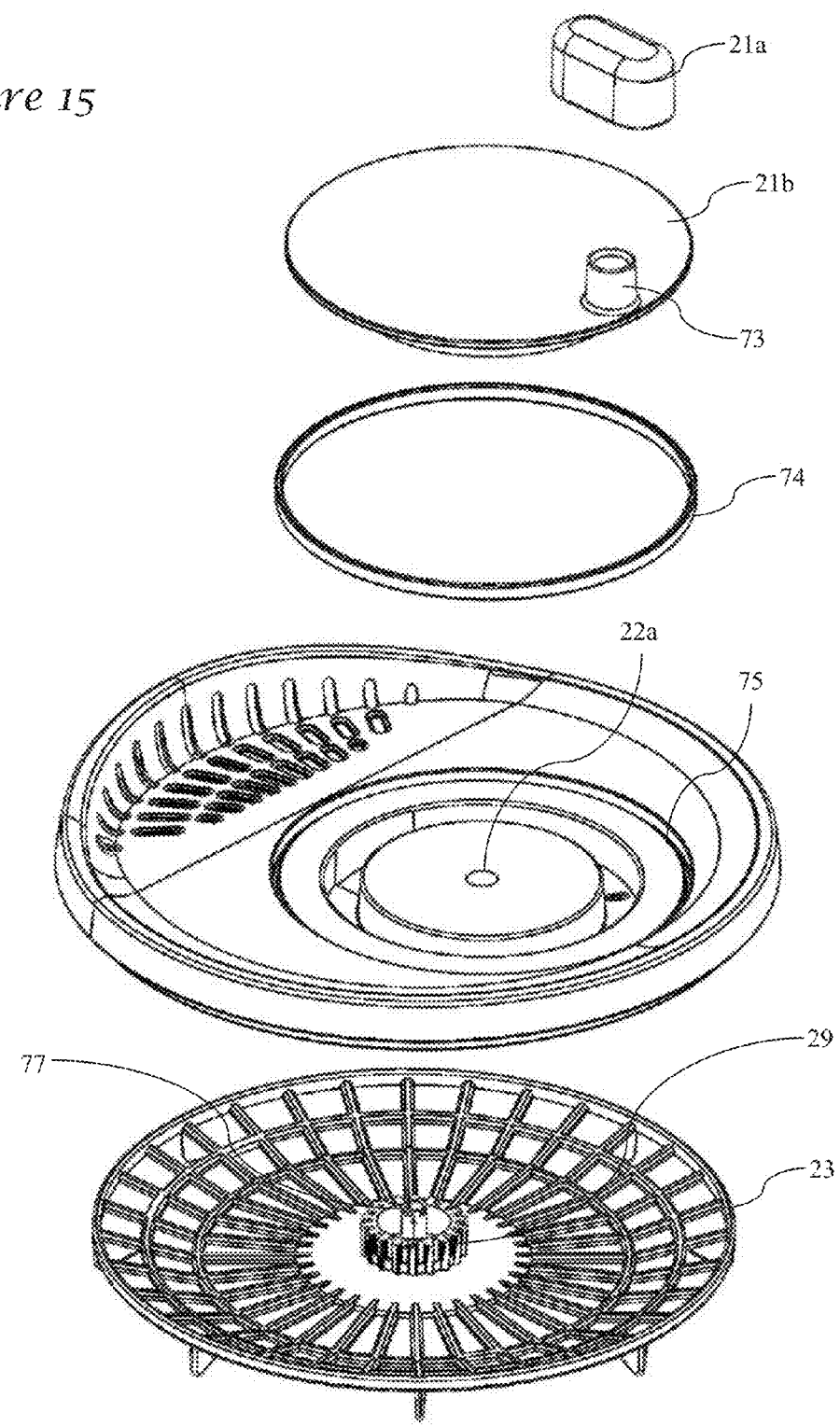
FIG. 15 is a top perspective exploded view of a preferred salad spinner lid.

In one version of the invention, the bottom of the basket includes a slightly raised hub 61 that extends upward from the bottom of the basket into the interior of the basket, thereby creating an upward concavity at the bottom of the basket. The basket hub is configured for receiving a spindle 44 (see FIG. 4) extending upwardly from the upper surface of the bottom of the bowl. The spindle 44 supports the basket at the hub 61 (see FIG. 13) so that the remainder of the basket is raised slightly above the bottom of the bowl, allowing the basket to spin freely on the spindle in a manner that preferably avoids contact of the bottom of the basket with the bottom of the bowl. Similarly, in the preferred version the basket is sized such that the outer diameter of the basket is less than the inner diameter of the bowl in order to allow the basket to spin without the sidewalls of the basket contacting the sidewalls of the bowl.

The bowl 40 includes a bottom surface and upwardly extending sidewalls terminating in an upper rim 46. As noted above, the bowl is sized and shaped to receive the basket 30 within the interior space defined by the bowl. Likewise, when the lid 20 is seated atop the bowl 40, it fully encloses the basket 30 within the bowl and the lid.

A lower portion of the bowl includes a number of through holes providing fluid passageways from the inner space within the bowl to the outside of the bowl. In the illustrated version, a plurality of holes 43 are provided at the bottom surface of the bowl. Most preferably, the bottom surface of the bowl is substantially horizontal and planar in shape with respect to the relatively vertical sidewalls. A first plurality of through holes 43 is positioned in this horizontal portion of the bottom of the bowl. In one version of the invention, a second plurality of through holes 42 is provided at a lower portion of the upwardly extending sidewalls of the bowl. The combination of holes both on the lower horizontal portion and the upper vertical portion increases the amount of fluid that can flow through the bowl. In various versions of the invention, there need not be the same number or arrangement of holes 42, 43 as illustrated. Rather, in some versions of the invention there may be as few as one single hole in the bottom of the bowl, depending on size and location of the hole.

One or more feet 41 are attached to the bottom of the bowl to provide a surface for engaging a horizontal surface on which the bowl may rest. For example, the bowl may be placed in a sink with the feet supporting the bowl in the sink. This arrangement allows the salad spinner as described above to be used within a sink, with the water produced by the spinning action of the basket hitting the inner sidewalls of the bowl and running through the holes 42, 43 and into the sink. Most preferably, the feet are formed from a resilient, elastomeric material.

The salad spinner further includes, in one version of the invention, a lower lid or tray 50. The lower lid is configured with a peripheral rim 57 which mates with a corresponding peripheral surface 45 such as a shelf or groove formed on a lower outer portion of the bowl 40. In some versions of the invention, the lid and bowl may simply be friction fit against one another, while in other versions the lid and bowl may have complementary tongue and groove, tab and slot, overlapping ribs, or other such features that allow the lower lid to be removably snap fit or otherwise attached to the bowl.

Preferably, the lower lid is shaped to define an interior space between the inside of the lower lid and the outside of the bowl when the lid is attached to the bowl. Thus, in the illustrated example lower lid includes a central portion 55 which is somewhat raised with respect to an outer annular portion 54. The outer annular portion is separated downward and away from the bowl when the lid is attached to the bowl, thereby providing a space for receiving and retaining water. In this fashion, the salad spinner may be used with the lower lid attached to the bowl such that water may travel through the through holes 42, 43 formed in the bowl and be retained in the annular space 54 formed in the lower lid.

Figure 6:
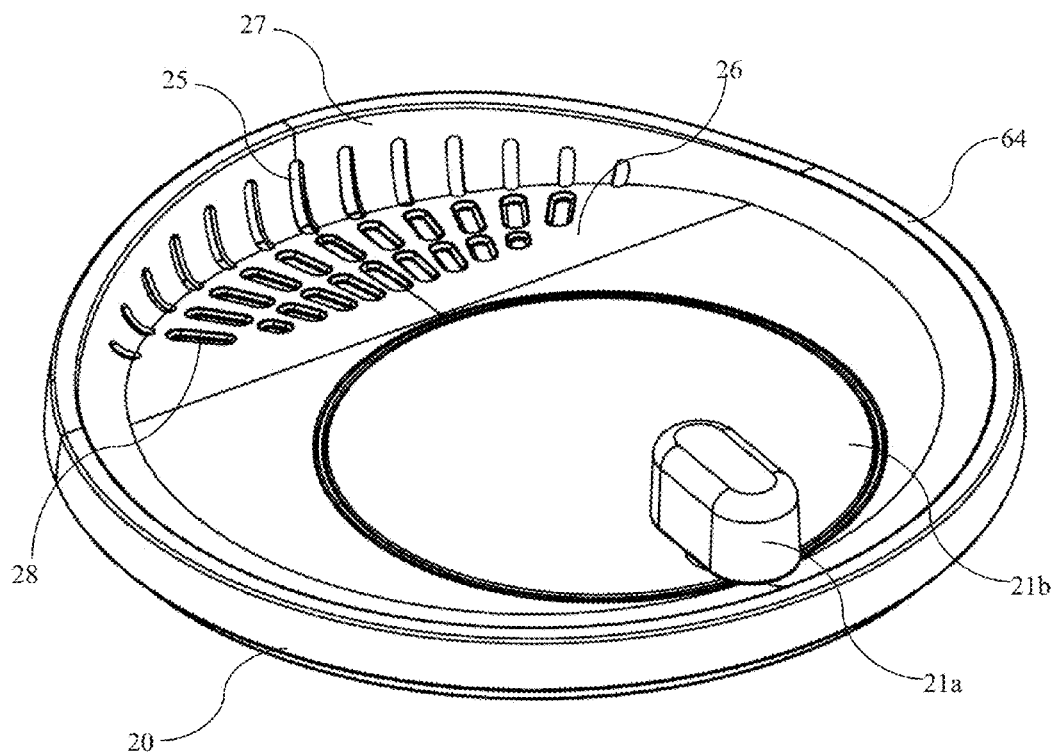
FIG. 6 is a top perspective view of a preferred salad spinner lid.
Figure 7:
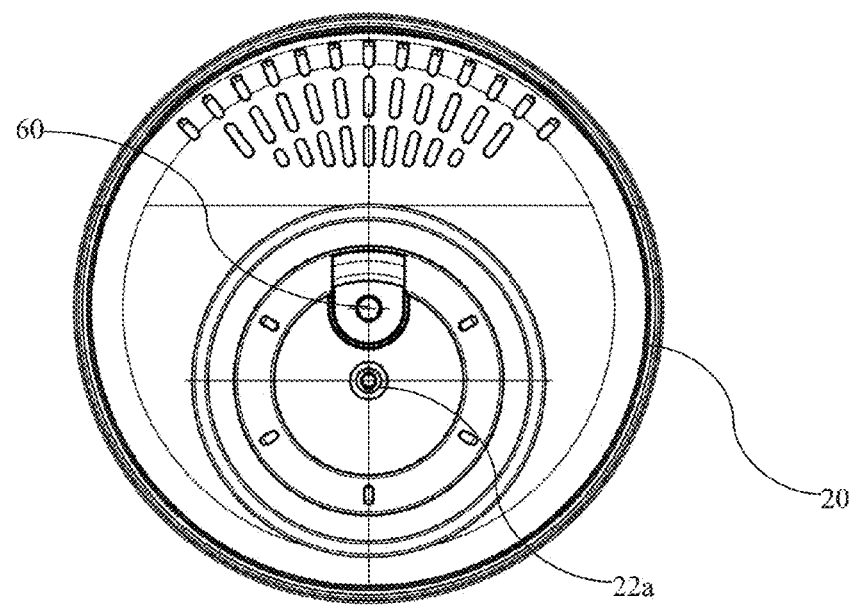
FIG. 7 is a bottom view of a preferred salad spinner lid, shown without an inner cage.
Figure 8:
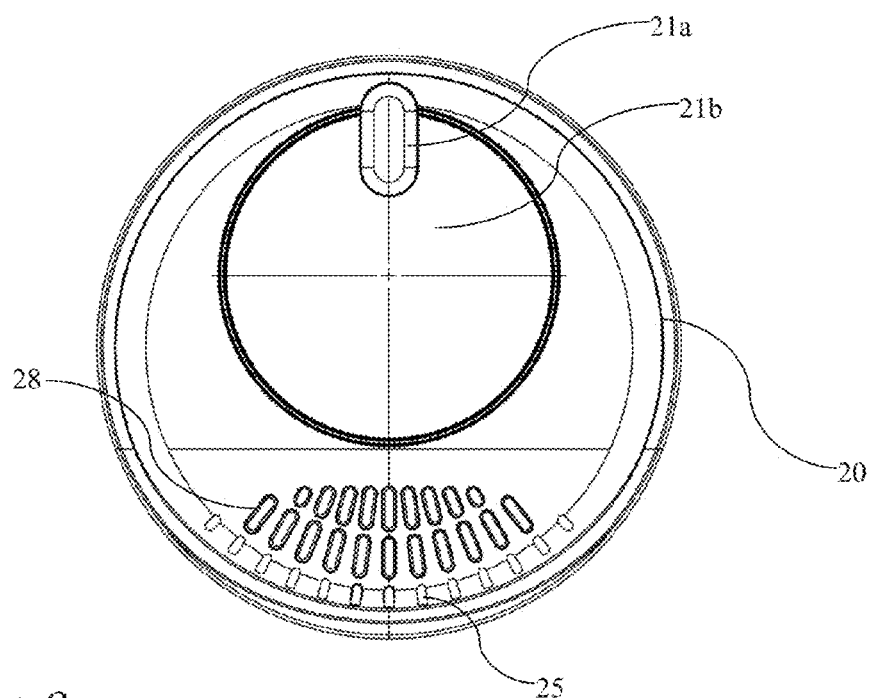
FIG. 8 is a top view of a preferred salad spinner lid.
Figure 9:
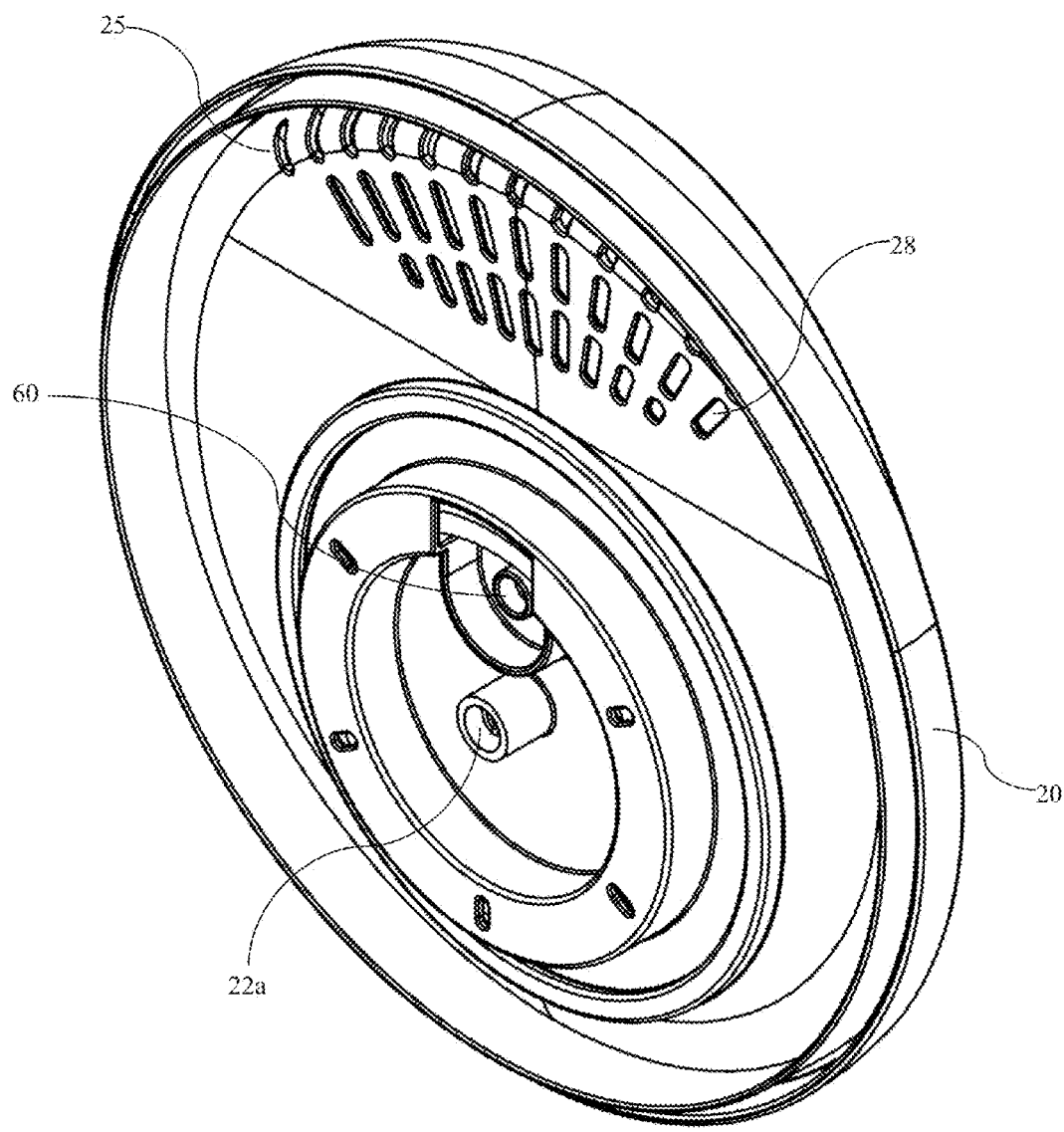
FIG. 9 is a bottom perspective view of the salad spinner lid of FIG. 7.

In a preferred example of the invention, the upper lid also includes one or more through holes allowing water to pass from outside the lid and into the bowl, or vice versa. In the illustrated example, the lid includes a peripheral rim 64 that is slightly raised around the entire perimeter of the lid, and further includes a raised lip 27 formed along one side of the lid 20. As best seen in FIG. 6, the raised lip 27 extends along about one third of the outer perimeter of the lid, and is raised above the adjacent interior surface of the lid to a height greater than the height of the rest of the surrounding peripheral rim 64. The lid further includes an upper central surface forming the interior of the lid inside the rim, with the upper central surface angling downward to form an inclined region 26 as it progresses from an interior portion of the lid toward the raised lip 27 at the perimeter of the lid.

One or more holes are formed in the lid, and in the illustrated version a first plurality of holes 25 is formed extending upwardly along the raised lip 27, and a second plurality of holes 28 is positioned on the angled or inclined portion 26 of the lid. The combination of the angled surface of the lid and the holes formed in the lid causes water on the lid to be directed downwardly along the angled surface and through the holes, directing the water into the bowl when water is poured onto the upper central surface of the lid.

The holes formed in the lid allow water to be poured into the salad spinner while the lid is in place, atop the bowl. Likewise, the holes formed in the bowl allow the salad spinner to be placed within a sink and used with water flowing out of the bowl and directly into the sink. In this fashion, it is possible to operate the salad spinner with water running from a faucet and through the lid via the holes formed in the lid. The water running onto the lid then enters the salad spinner where it encounters salad or other items within the basket. A user may operate the basket using the handle or other spinning mechanism that may be provided on the lid in order to clean and dry the salad within the basket. The water then continues to travel from the basket to the inner surface of the bowl, ultimately moving to the bottom of the bowl and out through the holes formed in the bottom. The positioning of the handle 21a and rotating disk 21b on one side of the lid and the inclined portion and through holes on the other side of the lid allows the handle to be operated without being under running water.

The configuration as described above allows a user to use the salad spinner in a variety of ways. As noted above, the user may operate the salad spinner with the lid in place and water running directly into the salad spinner during operation. Alternatively, the user may operate the salad spinner without water entering through the lid, but with the salad spinner positioned in a sink or in another location with the lower tray not being attached to the bowl. As yet another alternative, the salad spinner may be used in a conventional fashion such as on a countertop with the lower lid being attached to the bowl to collect water being flung away from the basket and through the through holes in the bowl. Even in this manner of operation, the salad spinner as described above provides advantages in ease of elimination of water within the salad spinner, which may be readily drained simply by removing the lower lid and dumping out the collected water. As another alternative, water collected at the bottom of the salad spinner may be drained through the through-holes formed in the lid by tipping the salad spinner toward its side, allowing the water to run along the sidewalls of the bowl and out the holes in the lid.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A salad spinner, comprising:
   a bowl having a bottom portion and upwardly extending sidewalls defining an interior space, the bottom portion having one or more openings configured to allow water to flow from the interior space out of the bowl;
   a basket sized and shaped to be received within the interior space of the bowl, the basket being configured to allow water to pass through the basket and into the bowl; and
   a circular lid sized and shaped to cover the bowl and the basket, the circular lid having a plurality of through-holes to allow the water to pass through the lid and into the bowl, the plurality of through-holes being positioned on one half of the circular lid, the lid further being removably attachable to the bowl and including a manually-operable drive, the manually-operable drive being coupled to the basket when the lid is positioned atop the bowl, whereby operation of the manually-operable drive causes the basket to spin within the bowl;
   wherein the lid further comprises a raised rim positioned about the perimeter of the lid and surrounding the entire perimeter of the lid;
   wherein the raised rim further comprises a raised lip provided on a portion of the raised rim and extending along one third of the perimeter of the lid, the raised lip extending to a height above the lip with respect to an upper central surface of the lid;
   wherein the lid further comprises an inclined portion on the upper central surface of the lid and adjacent the raised lip, the inclined portion being configured to direct water toward the plurality of through-holes; and
   wherein the plurality of through-holes comprises a first plurality of through holes formed on the inclined portion.

2. The salad spinner of claim 1, further comprising a cover removably attachable to the bottom portion of the bowl, the cover being sized and shaped to enclose the one or more openings in the bottom portion of the bowl.

3. The salad spinner of claim 2, wherein the one or more openings further comprises a first plurality of openings formed on a lower surface of the bottom portion and a second plurality of openings formed at least partially on the upwardly extending sidewalls.

4. The salad spinner of claim 2, wherein the cover further comprises a raised central portion and a lower peripheral annular portion, the annular portion defining an open space between the cover and the bottom portion of the bowl when the cover is attached to the bowl.

5. The salad spinner of claim 2, further comprising an elastomeric foot attached to the bottom portion of the bowl.

6. The salad spinner of claim 1, wherein the lid opening comprises a second plurality of through holes formed on the raised lip.

7. A salad spinner, comprising:

a bowl having a bottom portion and upwardly extending sidewalls defining an interior space;

a basket sized and shaped to be received within the interior space of the bowl, the basket being configured to allow water to pass through the basket and into the bowl; and a lid sized and shaped to cover the bowl and the basket, the lid having a perimeter with a raised peripheral rim extending around the perimeter of the lid, a raised lip provided on a portion of the raised rim, the raised lip extending to a height above the lip with respect to the upper surface of the center of the lid, an inclined portion on the upper surface of the lid and adjacent the raised lip, the inclined portion having a plurality of through-holes formed on the inclined portion, whereby the inclined portion is configured to direct water through the through-holes; and the lid further being removably attachable to the bowl and including a manually-operable drive, the manually-operable drive being coupled to the basket when the lid is positioned atop the bowl, whereby operation of the manually-operable drive causes the basket to spin within the bowl.

8. The salad spinner of claim 7, wherein the lid further comprises an additional plurality of through holes formed on the raised lip.

9. The salad spinner of claim 7, further comprising a cover removably attachable to the bottom portion of the bowl, the cover being sized and shaped to enclose the one or more openings in the bottom portion of the bowl.

10. The salad spinner of claim 9, wherein the one or more openings further comprises a first plurality of holes formed on a lower surface of the bottom portion and a second plurality of holes formed at least partially on the upwardly extending sidewalls.

11. The salad spinner of claim 9, wherein the cover further comprises a raised central portion and a lower peripheral annular portion, the annular portion defining an open space between the cover and the bottom portion of the bowl when the cover is attached to the bowl.

12. The salad spinner of claim 7, wherein the manually operable drive further comprises a rotating disk having gear teeth, the rotating disk being radially offset from the center of the lid in a direction away from the plurality of through-holes formed in the lid.

* * * * *